United States Patent [19]

Chiang et al.

[11] Patent Number: 5,800,861
[45] Date of Patent: Sep. 1, 1998

[54] HIGH SOLID INFRARED ABSORBING COMPOSITIONS

[75] Inventors: Chwan-Hwa Peter Chiang, Des Plaines; William Roland Dawson, Matteson; Layton Fredrick Kinney, Chicago, all of Ill.; Charles J. Sherman, Dyer, Ind.

[73] Assignee: The Sherwin-Williams Company, Cleveland, Ohio

[21] Appl. No.: 288,713

[22] Filed: Dec. 28, 1988

Related U.S. Application Data

[60] Division of Ser. No. 797,261, Nov. 12, 1985, which is a continuation-in-part of Ser. No. 766,158, Aug. 15, 1985.

[51] Int. Cl.[6] ............................... B05D 5/06; C08K 3/32
[52] U.S. Cl. ...................... 427/160; 252/587; 252/600; 427/385.5; 427/393.5; 521/62; 521/67; 521/76; 523/135
[58] Field of Search ........................ 252/587, 600; 427/160, 385.5, 393.5; 428/317.9, 919; 521/62, 67, 76; 523/135

[56] References Cited

U.S. PATENT DOCUMENTS

| | | | |
|---|---|---|---|
| 2,265,473 | 12/1941 | Cannell | 106/287 |
| 3,585,149 | 6/1971 | Vassiliades et al. | 428/402.2 |
| 3,629,130 | 12/1971 | Hovey | 252/587 |
| 3,669,899 | 6/1972 | Vassiliades et al. | 428/402.24 |
| 3,822,224 | 7/1974 | Gillan et al. | 521/62 |
| 3,839,253 | 10/1974 | Kershaw et al. | 523/206 |
| 3,879,314 | 4/1975 | Gunning et al. | 521/62 |
| 3,891,577 | 6/1975 | Kershaw et al. | 521/62 X |
| 3,895,826 | 7/1975 | Gunning | 525/162 |
| 3,923,704 | 12/1975 | Gunning et al. | 521/62 X |
| 3,933,579 | 1/1976 | Kershaw et al. | 162/164 |
| 3,947,277 | 3/1976 | Carnahan et al. | 106/26 |
| 3,951,894 | 4/1976 | Whelan, Jr. | 521/62 X |
| 3,956,235 | 5/1976 | Pasternack et al. | 523/459 |
| 3,961,933 | 6/1976 | Kuyama et al. | 71/67 |
| 3,972,845 | 8/1976 | Nikaido et al. | 523/402 |
| 4,007,142 | 2/1977 | Clarke et al. | 521/63 |
| 4,025,475 | 5/1977 | Enomoto et al. | 523/514 |
| 4,052,309 | 10/1977 | Hoizer et al. | 204/181.6 |
| 4,089,819 | 5/1978 | Coates et al. | 521/65 |
| 4,137,380 | 1/1979 | Gunning et al. | 521/62 |
| 4,169,825 | 10/1979 | Yapp et al. | 523/454 |
| 4,171,390 | 10/1979 | Hilterhaus et al. | 427/160 X |
| 4,206,100 | 6/1980 | Kyo et al. | 524/398 |
| 4,276,212 | 6/1981 | Khanna et al. | 524/512 |
| 4,282,129 | 8/1981 | Blount | 524/442 |
| 4,298,518 | 11/1981 | Ohmura et al. | 524/101 |
| 4,299,613 | 11/1981 | Cardarelli | 71/64 F |
| 4,374,947 | 2/1983 | Toothill et al. | 524/398 |
| 4,390,654 | 6/1983 | Schuler et al. | 524/413 |
| 4,433,010 | 2/1984 | Pedain et al. | 427/160 |
| 4,439,555 | 3/1984 | Doi et al. | 523/122 |
| 4,446,301 | 5/1984 | Belote et al. | 528/295.3 |
| 4,461,849 | 7/1984 | Karickhoff | 521/64 |
| 4,514,230 | 4/1985 | Passmore et al. | 106/243 |
| 4,563,153 | 1/1986 | Schaefer | 433/223 |

OTHER PUBLICATIONS

Bierwagen, *Journal of Coatings Technology*, vol. 54, pp. 19–24, (Dec. 1982).

*Primary Examiner*—Charles T. Jordan
*Assistant Examiner*—Matthew J. Lattig
*Attorney, Agent, or Firm*—Robert E. McDonald

[57] ABSTRACT

Infrared absorbing compositions useful as high solid coatings comprising 5–50% of a volatile solvent portion and 50–95% of a non-volatile portion which comprises a film-forming binder having dispersed within the binder opacifying polymeric beads and an infrared radiation absorbing pigment selected from the group consisting of copper phosphate, basic copper phosphate, copper pyrophosphate, tungsten trioxide and mixtures thereof.

22 Claims, No Drawings

HIGH SOLID INFRARED ABSORBING COMPOSITIONS

CROSS-REFERENCE TO RELATED APPLICATIONS

This is a divisional application of co-pending Ser. No. 797,261 filed on Nov. 12, 1985, which application was, in turn, a continuation-in-part of co-pending application Ser. No. 766,158 filed Aug. 15, 1985.

BACKGROUND OF THE INVENTION

The invention described herein was made with Government support under Contract No. F33615-79-C-5031 and F33615-81-C-5097. The U.S. Government has certain rights in the invention.

FIELD OF THE INVENTION

This invention relates to infrared absorbing compositions which are especially useful as high solid coatings which can be conventionally applied, e.g. by spray application, at a solids level of at least 50% and preferably at least 65% non-volatile by weight. The compositions of this invention when cast as films or utilized as coatings are unique in that they provide high solid coatings showing low gloss and very low reflectance of electro-magnetic radiation in the near infrared region (0.7 through about 2.5 microns wavelength).

DESCRIPTION OF THE PRIOR ART

U.S. Pat. No. 2,265,473 taught coating compositions utilizing basic copper phosphate or copper pyrophosphate as minor pigments in coatings having relatively high reflectance of visible light.

The use of opacifying polymeric beads has been taught in several U.S. patents including, U.S. Pat. Nos. 3,839,253; 3,879,314; 3,895,826; and 3,923,704.

None of the prior art, however, teaches high solid coatings comprising a film-forming binder, opacifying polymeric beads, and a specific infrared radiation absorbing pigment to provide durable compositions having low gloss readings and high absorption, and, therefore, low reflectance of near infrared radiation.

BRIEF SUMMARY OF THE INVENTION

This invention relates to high solid coatings which can be conventionally applied at room temperature at at least 50% and preferably at least 65% solids by weight. These coatings typically have application viscosities less than about five poise and most typically less than about two poise despite relatively low levels of solvent. This is especially unique in very low gloss or matte coatings where the normally high levels of extender pigments produce very high viscosities. The high solid coating compositions comprise 5–50% and preferably 5–35% by weight of a volatile portion which comprises at least one inert organic solvent, and 50–95% and preferably 65–95% by weight of a non-volatile portion which comprises a film-forming binder having dispersed within the binder opacifying polymeric beads and an infrared radiation absorbing pigment selected from the group consisting of copper phosphate, basic copper phosphate, copper pyrophosphate, tungsten trioxide and mixtures thereof. This invention also relates to a process for increasing the absorbtion of infrared radiation at the surface of a substrate which process comprises applying to the surface of the substrate the composition of this invention and subsequently allowing said composition to cure or dry. In one particular preferred embodiment the infrared radiation absorbing pigment and/or other pigments are incorporated within the polymeric opacifying bead to provide improved durability and lower application viscosities. In another preferred embodiment the film-forming binder comprises an active hydrogen functional polymer having a number average molecular weight less than about 6,000 and a crosslinker, preferably a polyisocyanate, reactive with the polymer under curing conditions. Active hydrogen functionality means those reactive groups as determined by the Zerewitinoff Method as described by Kohler in *J. Am Chem. Soc.*, 49, 3181 (1927) and include —OH, —NH, —SH, —COOH.

The composition of this invention can be cast as a free standing film or, preferably, it can be utilized as coating compositions to be applied to the surfaces of substrates.

Accordingly, it is an object of this invention to provide a high solid coating composition having relatively low gloss and relatively low reflection of electromagnetic radiation in the near infrared wavelengths. A more specific object is to provide high solid coatings, especially low gloss coatings (e.g. 85° gloss readings less than 10) having pigment-containing opacifying polymeric beads dispersed in a film-forming binder to impart reduced reflectance of electromagnetic radiation in the near infrared wavelengths. Another object of this invention is to provide a composition capable of absorbing infrared radiation. It is another object of this invention to provide light colored high solid coatings which are capable of absorbing significant amounts of infrared radiation. These and other objects of this invention will be apparent from the following discussions.

DETAILED DESCRIPTION OF THE INVENTION

Infrared radiation is present in the electromagnetic radiation emitted by the sun and is also mechanically produced for a number of reasons. Infrared radiation, when absorbed, is converted to sensible heat. The compositions of this invention therefore have special utility in absorbing infrared radiation and converting it to heat energy. This property is especially useful in instances where heat absorption and storage is desired, such as in coatings which are baked or irradiated by infrared radiation to provide cure, or in passive solar collectors such as Trombe walls which function as passive thermal storage devices for heating and cooling of homes and other structures.

The Trombe system is described, in general, in U.S. Pat. No. 3,832,992 and utilizes a wall of masonry construction which is faced with glass or other radiant transmitting material spaced from the wall to accomplish a greenhouse effect. During the day, solar energy is absorbed and transmitted into the wall by conduction into the masonry. Heat is withdrawn from the wall primarily by convection with air flowing from within the building to the space between the outer surface of the wall and the transparent facing and then again into the structure from the top of the wall. The use of the infrared absorbing coatings taught herein will provide improved thermal efficiency to the structures. The compositions of this invention can provide light colored or pastel colored coatings or films as opposed to the prior art systems which typically relied on dark colored pigments, such as carbon black, for infrared absorption.

There is also a military significance to the invention described herein. Reflected infrared radiation can be observed by specially equipped cameras or infrared sensing devices which could be used on missiles, bombs or other weapons having tracking systems which rely on the emission or retroflection of infrared radiation. The compositions of this invention, when applied to substrates can lower the reflection of infrared radiation to 10 or less of the incident radiation and can make detection and tracking much more difficult for any infrared sensing device.

The high solid nature of these coatings minimizes pollution, and provides a more cost effective coating since less solvent is required to provide sprayable viscosities.

Various types of binders useful in high solids coatings are known in the art. Unsaturated polymers, such as unsaturated polyesters made by the reaction of maleic anhydride or acid with one or more polyols, can be utilized in combination with unsaturated liquid monomers, such as styrene, methyl (meth)acrylate, butyl acrylate, etc. as reactive diluents to provide free radical polymerizable systems which require relatively little solvent to provide applicable viscosities.

The film-forming binders which are especially preferred in the practice of this invention include any material or combination of materials which will dry upon evaporation of solvent and/or polymerize or cure by chemical reaction and which have a relatively low molecular weight prior to curing or drying to minimize the viscosity. Typically the binders will be one or more polymers having a number average molecular weight less than about 6,000 and especially less than about 3,000. Most especially preferred is the use of at least one polymer having a number average molecular weight less than about 1,500.

If desired, small amounts, e.g. less than about 40% and preferably less than about 10% of the total binder by weight may include higher molecular weight materials, e.g. having number average molecular weights greater than about 8,000 provided they do not increase the final coating viscosity at at least 50% solids by weight to more than about five poise.

The film-forming binders of this invention can include various relatively low molecular weight thermoplastic or thermosetting vehicles such as those well known in the coating art including: epoxies, acrylic enamels, alkyd enamels, polyester enamels, and polyurea or polyurethane enamels. Methods of preparing each of these materials are well known in the art. High solid alkyd or polyester film-forming binders are well known in the art and can be prepared in a known manner by the condensation of polyhydric alcohols and polycarboxylic acids or anhydrides, with or without the inclusion of non-drying, semi-drying or drying oil fatty acids. By adjusting the stoichiometry of the alcohols and the acids, polymers can be readily produced having an excess of either acid or alcohol functionality. The molecular weight can be readily controlled by using an excess of one of the starting materials, usually the alcohol, and by minimizing the use of polyfunctional materials such as triols which can cause excessive branching. A representative high solid polyester vehicle is taught in U.S. Pat. No. 4,169,825. Representative high solid alkyds which either air dry or can be crosslinked with a coreactant are taught in U.S. Pat. Nos. 4,514,230, 4,025,475, 4,446,301 and 4,282,129. The teachings of each of these patents is hereby incorporated by reference. Commercially available high solid polyester include Multron® R-18 and Desmophen® 670, 1700 and 1770 vehicles sold by Mobay Chemical Corp.

Other especially useful high solid polymers include the hydroxy functional polycaprolactone polymers obtained by the reaction of caprolactone with polyols. Representative low molecular weight polycaprolactone polymers are marketed under the Niax® or Tone® tradename by Union Carbide Corporation.

Also especially useful are the polyether polyols obtained by the polyol initiated polymerization of propylene oxide, ethylene oxide, butylene oxide or other 1,2 epoxies. These materials, which are commercially available from a number of sources include Voranol® products from Dow Chemical Co., Pluracol® products from BASF-Wyandotte, and Niax® or Tone® products from Union Carbide.

High solid acrylic resins containing amine functionality, hydroxyl functionality, epoxy functionality, etc. can also be prepared by methods well known in the art. The acrylic polymers are typically prepared by the addition polymerization of one or more unsaturated monomers. Typically the monomers include one or more alkyl esters of acrylic acid or methacrylic acid optionally together with one or more ethylenically unsaturated monomers. Suitable acrylic esters include methyl methacrylate, ethyl methacrylate, propyl methacrylate, butylacrylate, vinylacetate, etc. Monomers having active hydrogen or epoxy functionality which can The incorporated into the acrylic polymers include acrylic acid, methacrylic acid, 2-hydroxyethyl acrylate, 4-hydroxybutyl methacrylate, t-butyl amino ethyl methacrylate, glycidyl methacrylate, etc. A representative high solid acrylic vehicle is taught in U.S. Pat. No. 4,276,212 which is hereby incorporated by reference. Commercially available high solid acrylics include, representatively, the G-Cure® series of acrylics sold by Henkel.

Typically, the acrylics are prepared by conventional free radical addition polymerization techniques. If desired, the polymerization can be catalyzed by conventional catalysts known in the art such as azo, peroxy, or redox catalysts. The molecular weight of the polymer can be controlled by the monomer selection, reaction temperature and time, and/or the use of chain transfer agents such as mercaptans, secondary alcohols, or halogenated hydrocarbons as is well known in the art. Typically, the acrylic monomers are heated at temperatures ranging from about 120° F. to about 400° F. and especially 180° F. to 300° F. to effect the polymerization.

The coatings of this invention may also incorporate a cross-linking agent as part of the binder system as is known in the art. Polyisocyanates, which optionally may be blocked, are useful crosslinking agents for active hydrogen functionality, e.g. —OH, —NH, —SH, —COOH, etc. containing vehicles. Polyepoxides having at least two epoxy groups are useful in crosslinking reactions with vehicles having amine or carboxylic acid functionality. Aminoplast resins are useful crosslinkers for reaction with polymers; having hydroxyl functionality. Epoxy functional vehicles can be crosslinked by reaction with polyamine, anhydrides or polycarboxylic acid crosslinkers.

The isocyanate functional crosslinkers are well known in the art. The isocyanate crosslinkers contain two or more isocyanate groups per molecule, and if desired can be blocked by reaction with phenol, t-butanol, caprolactam, diethyl malonate, etc. Representative polyisocyanates include the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 3-isocyanotomethyl-3,5,5-trimethyl-cyclohyexylioscyanate, and the 1,3-cyclopentane, 1,4-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4'-diphenyl -triisocyanate, 1,3,5-triisocyanate benzene and 2,4,6-triisocyanate toluene; and the tetraisocyanates such as 4,4'-diphenyl-dimethyl methane-2,2'- 5,5'-tetraisocyanate; the polymerized polyisocyanates such as tolylene diisocyanate dimers and trimers, and other various polyisocyanates containing biuret, urethane, and/or allophanate linkages. Especially preferred in the practice of this invention are the relatively low molecular weight biurets of hexamethylene diisocyanate such as L-2291 marketed by Mobay Chemical Co.

Aminoplast resins are condensates of an aldehyde such as formaldehyde, acetaldehyde, benzaldehyde or mixtures thereof with a nitrogenous compound such as urea, melamine, or benzoguanamine or a lower alkyl ether of such a condensate. The lower alkyl ethers are conveniently prepared by the reaction of alcohols such as methanol, ethanol, benzylalcohol, etc. with the reaction product of the aldehyde and the nitrogenous compound.

The coatings of this invention will contain about 5 to 50% and preferably 5 to 35% by weight of at least one volatile inert organic solvent which is not reactive with the vehicle or the crosslinker, if any, under conditions of storage or cure. Depending upon the film-forming binder, typical solvents include toluene, xylene, butyl acetate, methyl ethyl ketone, ethoxy-ethanol, etc. The high solid coatings will have viscosities less than about 5 poise and preferably less than about 2 poise at these relatively low levels of solvent which allows room temperature application of the coatings by any conventional method such as spraying, flow coating, roll coating, dipping, brushing, etc.

If desired, the compositions of this invention may also include pigments conventionally used for coating or plastic applications such as titanium dioxide, iron oxide, carbon black, organic pigments such as phthalocyanine blue, etc. The composition may also contain other additives such as flow agents, surfactants, catalysts, utltra violet light absorbers, etc.

When utilized as a coating, the composition of this invention may be applied to any substrate such as metal, plastic, wood, glass, synthetic fibers, etc. If desired, the substrate may be primed or otherwise painted prior to the application of the coating.

When utilized as a coating, the composition of this invention need only be applied to the substrate to a sufficient film thickness to provide the protection and infrared absorption characteristics desired. Typical film thicknesses for the cured or dried coatings would range from about 0.1 mil to about 50 mils and most commonly from about 0.5 to about 3 mils.

Curing or drying the compositions of this invention can be accomplished by any means appropriate for the film-forming binder utilized. Curing can be accomplished by air oxidation, baking, free radical polymerization by ultra violet or electron beam radiation, etc. In one preferred embodiment of this invention which utilizes an active hydrogen functional resin and a polyisocyanate as the film-forming binder the composition can be allowed to cure at room temperature or can be baked at temperatures typically ranging up to about 250° F. If a blocked isocyanate melamine or urea crosslinker is utilized, the coating composition will typically be cured at temperatures from about 250° F. to about 400° F.

The opacifying polymeric beads which are useful in the practice of this invention are non-film-forming synthetic polymerized particles, typically less than about 200 microns average diameter, which are substantially insoluble in the film-forming binder in which they are subsequently dispersed. The beads may be spherical or non-spherical. The opacifying polymeric beads may be substantially solid or they may contain discrete vesicles or pores and may optionally contain pigments dispersed within the bead itself. The exact chemical composition of the opacifying polymeric beads is not critical in the practice of this invention as long as the beads can be stably dispersed in the film-forming binder and as long as the beads do not appreciably soften at the curing temperature of the binder.

Methods of producing synthetic opacifying polymeric beads are well known in the art. For example, pure polymer beads made of polypropylene (marketed under the trademark Hercuflat® by Hercules, Inc.) and polyethylene (sold under the trademark Microthene's marketed by U.S. Industrial Chemicals Co.) have been known to be effective matting agents in coatings where low oil absorption is required. Other representative examples include solid urea/formaldehyde beads prepared by dispersing an aqueous urea/formaldehyde convertible syrup in a hydrocarbon liquid in globules of approximately the diameter of the required beads, curing of the convertible syrup to solid, cross-linked polymer followed by azeotropic stripping of water from the system to give an anhydrous slurry of beads in hydrocarbon liquid as taught in U.S. Pat. No. 3,895,826. The manufacture of retiporous-amine resin granules either with or without pigment dispersed within the particles is taught in U.S. Pat. No. 4,007,142. U.S. Pat. No. 3,585,149 teaches opacifying beads which are produced by heating liquid containing precursor microcapsules at temperatures sufficient to expel the liquid and provide air in the microcapsule. U.S. Pat. No. 3,839,253 teaches a method of manufacturing solid opacified pigmented polymeric beads by dispersing a pigment in a suitable polymerizable monomer or polymer which is then emulsified in water and polymerized to form insoluble granules of the required composition. The polymeric composition of these granules can include condensation polymers, e.g. polyester, phenolic, phenolformaldehyde, urea-formaldehyde and epoxy resins as well as addition polymers such as the polymers of alpha,beta-ethylenically unsaturated monomers such as styrene, alpha-methyl styrene, vinyl toluene, vinyl acetate, and lower saturated alcohol esters of acrylic and methacrylic acid. An especially preferred composition to be used as the opacifying polymeric beads of this invention are beads prepared by the reaction of unsaturated polyesters and alpha, beta ethylenically unsaturated monomers as taught in U.S. Pat. Nos. 3,822,224, 3,879,314, 3,891,577, 3,923,704, 3,933,579, 4,089,819, 4,137,380, and 4,461,849. The teachings of all of these patents concerning the manufacture of opacifying polymeric beads is hereby incorporated by reference.

The processes for producing the preferred unsaturated polyester/unsaturated monomer beads are well known in the art. In the preparation of solid (free of vesicle) beads the general process requires the preparation of an oil phase of the polyester/ unsaturated monomer which optionally may have pigments dispersed therein, and the subsequent dispersion of this oil phase into an aqueous phase containing a thickener solution and a protective colloid. The emulsion is agitated to generate droplets of the oil phase of the desired bead size within the aqueous phase. A polymerization initiator is then added and the reaction continued until the crosslinked solid beads are produced. Additional water is added to cause the solid beads to settle, the beads are separated and then dried by air drying and by vacuum drying to produce the solid beads which optionally will contain pigment.

Vesiculated beads can be prepared by forming as a water-in-oil emulsion a stable dispersion of droplets of water, which optionally may also contain pigment, in a solution of the unsaturated polyester resin/unsaturated monomer, and then forming in an aqueous solution, as a water-in-oil-in-water emulsion, a stable dispersion of globules of the droplet-containing unsaturated polyester/unsaturated monomer in an aqueous solution containing a thickener and a protective colloid. This mixture is agitated to produce the desired bead size and a polymerization promoter is added to the mixture and the reaction continued until the cross-linked beads are formed. The beads are separated and can be allowed to air dry and vacuum dry to produce the vesiculated beads which may optionally contain pigment.

In the practice of this invention it is especially preferred to incorporate at least some and most preferably all of the infrared absorbing pigment within the solid or vesiculated opacifying polymeric bead.

The opacifying polymeric beads, in addition to providing opacity also help provide higher application solids due to their characteristic lower oil absorption than that of convention pigments. If desired, other pigments can be incorporated within the opacifying polymeric beads either along with, or instead of, the infrared absorbing pigments.

It is especially preferred in the manufacture of the unsaturated polyester/unsaturated monomer beads that the unsaturated polyester resins be carboxylic acid functional resins which can be stabilized in water by the addition of amine. The carboxylic acid functional polyester resins can be formulated and manufactured by the reaction of polybasic acids or their corresponding anhydrides and polyols. Methods of making such carboxylic acid functional polyester resins are well known in the art. The preferred carboxylic acid functional polyester resins are prepared by the reaction of polybasic acids or their corresponding anhydrides and a dihydric alcohol. Polymerizable unsaturation is introduced into the polyester by the selection of an unsaturated acid or anhydride optionally in combination with a saturated acid or anhydride.

Suitable acids for producing the beads are, for example: unsaturated aliphatic acids such as maleic, fumaric, itaconic, citraconic and mesaconic; saturated aliphatic acids such as malonic, succinic, glutaric, adipic, pimelic, azelaic, tetrahydrophthalic, chlorendic and sebacic acids; and aromatic acids, such as phthalic, isophthalic, terephthalic, tetrachlorophthalic, trimellitic and trimesic.

Suitable dihydric alcohols are, for example, ethylene glycol, poly(ethylene glycols) e.g. diethylene glycol, 1,6-hexanediol, propylene glycol, dicyclohexanol and neopentyl glycol. Alternatively the alcohol may be one which initially contained three or more hydroxyl groups, the groups in excess of two optionally being, at least in part, etherified with, for example, a monohydric alcohol, e.g. methanol, ethanol and n-butanol or esterified with a monobasic acid, e.g. benzoic acid, or chainlike aliphatic acids of up to 18 carbon atoms chain length, e.g. coconut oil monoglyceride.

The polyesters will typically have an acid value between 5 and about 60 and a number average molecular weight between about 500 and 100,000. An especially preferred polyester in the manufacture of beads used in this invention is the condensation reaction product of propylene glycol, fumaric and phthalic anhydride. If desired, more than one polyester can be utilized as a blend to optimize desired characteristics.

The ethylenically unsaturated copolymerizable monomer in which the unsaturated polyester resin is dissolved and crosslinked must be essentially water-insoluble. Monomers which have a solubility at 20° C. of less than 5% (w/w) in water are considered to be suitably water-insoluble for this purpose. A single monomer or a mixture of monomers may be used and in general the monomer will contain only a single polymerizable double bond. However, it is known that poly-functional monomers, that is monomers containing more than one polymerizable double bond, may also be used to crosslink unsaturated polyester resins. Such poly-functional monomers are, however, normally present only as a minor constituent of a mixture of monomers, the major proportion of which is mono-functional monomer. Hence mixtures comprising, e.g. divinyl benzene, may be used in the manufacture of the solid or vesiculated beads.

The preferred ethylenically unsaturated monomers for the manufacture of the beads are styrene, vinyl toluene and methyl methacrylate, because of the ease with which they can be copolymerized with the unsaturated polyester resin. For the best results, the monomer should comprise at least 50% by weight of styrene, and it is usually preferred to use styrene as the only monomer.

Bearing in mind the requirements that the total monomer mixture must be essentially insoluble in water and also be a solvent for the unsaturated polyester resin, there may be present, in a minor proportion, other polymerizable unsaturated monomers which can modify the physical properties of the beads comprising the coreacted resins. Typical co-monomers are, for example, ethyl acrylate, n-butyl methacrylate, acrylonitrile, and triallyl cyanurate. In general, the upper limit of usefulness of such monomers is about 10% by weight based on the total monomer used.

Suitable stabilizers and protective colloids useful in the manufacture of the beads include polyvinyl alcohol or hydroxy ethyl cellulose which help maintain the emulsions at the required bead size.

Useful polymerization initiators for the free radical addition polymerization of the unsaturated polyester/unsaturated monomer mixture can be any free radical initiator, e.g. an organic peroxide or by exposure to a radiation source such as ultraviolet radiation. When an organic source of free radicals is used this is conveniently introduced into the reactants by dissolving it into the monomer or polyester solution before the globule suspension is prepared. The free radical source is then activated by e.g. heating to its decomposition temperature. Alternatively, a redox process using e.g. diethyl aniline as an activator may be used. Typically, the particle size of the opacifying polymeric beads will be less than 500 microns, and normally less than 200 microns, in diameter. Especially preferred are particle sizes between 0.1 and 100 microns.

If the film-forming binder used in the practice of this invention is a water reducible binder it is not necessary to dry the aqueous solution of the polymeric beads. In the compositions of this invention, it is only necessary that the opacifying polymeric beads be present in an amount sufficient to provide the desired opacity and, if the beads contain all of the infrared radiation absorbing pigment, the beads must be present in an amount to provide the required level of infrared absorbtion. Typically, the beads will be present in an amount ranging from about 1.0 to about 1,000 parts by weight beads for each 100 parts by weight solid of the film-forming binder.

The infrared radiation absorbing pigments useful in this invention include copper phosphate, basic copper phosphate, copper pyrophosphate, tungsten trioxide and mixtures of these materials. For its ease of manufacture, density, durability, solubility characteristics and infrared absorption characteristics, basic copper phosphate is especially preferred. It is only necessary that a sufficient amount of the infrared radiation absorbing pigment be dispersed in the film-forming binder to provide the amount of infrared absorption desired. Typically, however, it is useful to provide about 5–200 parts by weight, and especially 10–150 parts by weight of the infrared radiation absorbing pigment for each 100 parts by weight of the film-forming binder.

The infrared radiation absorbing pigments are available commercially or they can be manufactured by synthetic techniques well known in the art.

When the film-forming binder is a crosslinking one, the conventional crosslinking agent, if any, for purposes of this invention, is included in the parts by weight of the non-volatile film-forming binder portion to determine the respective amounts of the preferred levels of the volatile solvent, and the infrared radiation absorbing pigment.

The following examples are intended to illustrate the invention but are not presented as limitations upon the scope of the claims. Unless otherwise indicated the term "parts" means parts by weight.

EXAMPLE 1

Basic copper phosphate was prepared in excellent yield by the following process. 100 parts by weight of cupric sulfate ($CuSO_4 \cdot 5H_2O$) was dissolved in 900 parts water. 23 parts 85% $H_3PO_4$ was then added followed by 41.6 parts of anhydrous $Na_2CO_3$. After foaming due to the evolution of carbon dioxide ceases, the mixture was heated with stirring and held at 80° C. for 30 minutes. After cooling, the basic copper phosphate precipitate was washed by repeated decantation and filtering and then dried. Scanning electron microscope analysis of the basic copper phosphate particles indicated that the particles were bipyramidal having average lengths of about 0.5 micron and average diameters of about 0.1 micron.

EXAMPLE 2

Clear solid opacifying beads were prepared according to the recipe below:

| Part | Component | Parts by Weight |
|---|---|---|
| A | Unsaturated polyester[1] | 1615 |
|   | Styrene Monomer | 216 |
|   | Benzoyl peroxide | 28 |
| B | 1.5% hydroxyethyl cellulose in water | 400 |
|   | 7.5% polyvinyl alcohol in water | 250 |
|   | Water | 1215 |
| C | N,N-Diethylaniline | 9 |
| D | Water (50° C.) | 780 |

[1]Condensation polymerization product of propylene glycol/fumaric acid/ phthalic anhydride in a 42.8/38.7/18.5 weight ratio as a 65.5% NVM solution in a 93/7 mixture of styrene/xylene. Acid value 22.5.

Part A was mixed and stirred for 20 minutes and then introduced slowly into Part B while mixing with a Cowles impeller. After 20 minutes of mixing, Part C was added and the stirring speed was reduced. After one minute of mixing Part D was added. The batch was allowed to exotherm and temperature was controlled at about 50° C. for one hour after which the stirring was stopped and the batch was cooled, washed repeatedly with water and allowed to dry. The clear solid beads had an average particle size diameter of approximately 21 microns.

EXAMPLE 3

This example teaches the manufacture of a solid pigmentary bead having pigments, including basic copper phosphate, dispersed therein.

A grind paste was prepared by dispersing on a 3-roll mill the following materials:

| Raw Materials | Parts by Weight |
|---|---|
| Lampblack acidic | 3759.12 |
| Phthalo blue | 181.60 |
| Indofast violet | 163.44 |
| Unsaturated Polyester A[1] | 1398.32 |
| Unsaturated Plyester B[2] | 5593.28 |

[1]unsaturated polyester/styrene commercially available from Reichhold Chemicals Inc. as 94-064 M.
[2]unsaturated polyester/styrene commercially available from Reichhold Chemicals Inc. as 31-830.

This was designated grind phase A.

A second grind phase was prepared by dispersing on a three roll mill the following mixture:

| Raw Materials | Parts by Weight |
|---|---|
| Titanium Dioxide | 13,116.06 |
| Unsaturated Polyester A | 4,467.36 |
| Unsaturated Polyester B | 17,864.90 |

This was designated grind phase B.

The oil phase for the preparation of the pigmented beads was prepared by adding a blend of 4,613.72 parts of grind phase A with 9,080.00 parts of Unsaturated Polyester A. This blend was added to a mixed solution of 29,473.68 parts grind paste B, 9,080.00 parts Unsaturated Polyester A, 1,943.12 parts styrene, 812.66 parts benzoyl peroxide and 122.86 parts basic copper phosphate. The oil phase was mixed for about 2 hours using a high speed impeller and then added slowly, while mixing into a premixed aqueous phase which comprised:

| Raw Material | Parts by Weight |
|---|---|
| 1.5% solution hydroxyethyl cellulose in water | 44,038.00 |
| 7.5% solution of polyvinyl alcohol in water | 27,694.00 |
| Water | 64,309.10 |
| Sodium dihexyl sulfosuccinate | 962.00 |

The oil phase and the aqueous phase were mixed for about 1.5 hours and then 564.00 parts diethyl aniline were added and the mixing was continued for about one hour while the reaction temperature was increased gradually from about 50° C. to about 75° C.

The polymerized beads were allowed to stand overnight then filtered, washed five times with water by decantation then dried in an oven at about 150° F. for four days.

EXAMPLE 4

In the manner of Example 3, dried pigmentary polymeric beads having the pigment dispersed within the beads were prepared having the following final composition by weight:

| Raw Material | Parts by Weight |
|---|---|
| Lampblack Acidic | 5.17 |
| Titanium Dioxide | 8.77 |
| Chrome Yellow | 48.25 |
| Reichhold Polyester/Styrene 94-064M | 6.51 |
| Reichhold Polyester/Styrene 31-830 | 26.06 |

-continued

| Raw Material | Parts by Weight |
| --- | --- |
| Styrene Monomer | 3.55 |
| Benzoyl Peroxide | 1.48 |
| Basic Copper Phosphate | 0.21 |

EXAMPLE 5

A high solid coating composition was prepared by dispersing the following materials using a high speed impeller:

| Raw Materials | Parts by Weight |
| --- | --- |
| Opacifying polymeric beads of Example 3 | 396.30 |
| Polycaprolactone polyol PCP-0300[1] | 89.09 |
| Multron R-18[2] | 59.40 |
| 10% solution dibutyltin dilaurate | 7.42 |
| 10% solution zinc octoate | 7.42 |
| Tinuvin 770 light stabilizer | 3.42 |
| CAB-331-0.1 (10% solution cellulose acetate butyrate) | 6.83 |
| Methyl ethyl ketone | 165.65 |
| 2-ethoxyethyl acetate | 47.33 |
| n-butyl acetate | 11.83 |
| Xylene | 11.83 |

[1]polycaprolactone polyol manufactured by Union Carbide having a molecular weight of 540 and a hydroxyl number of 310.
[2]Multron ® R-18 100% nvm saturated polyester resin sold by Mobay Chemical Co. having a hydroxyl number about 69.0

100 parts of the polyester based vehicle described in the above paragraph was mixed with 23.99 parts Desmodur® L-2291 (polyisocyanate marketed by Mobay Chemical Company). The coating was sprayed over primed, untreated aluminum panels and cured 60 minutes at 120° F. This coating showed pencil hardness of 2H, a 60° gloss of 0.5%, an 85° gloss of 2.3% and had reflectance in the near infrared region from about 0.7 to about 1.5 microns of less than 10%.

EXAMPLE 6

A high solids coating was prepared according to the following recipe:

| Raw material | Parts By Weight |
| --- | --- |
| Niax ® Polyol PCP-0300[1] | 13.12 |
| Polyglycol P1200[2] | 3.26 |
| Pigmented Beads From Example 4 | 35.81 |
| Tinuvin ® 770[3] light stabilizer | 0.27 |
| 2-ethoxyethyl acetate | 9.95 |
| Xylene | 2.49 |
| Methyl ethyl ketone | 2.49 |
| Dibutyltin Dilaurate (10% Solution) | 1.30 |

[1]Polycaprolactone Polyol manufactured by Union Carbide having a molecular weight of about 540 and a hydroxyl number of 310.
[2]Polypropylene Glycol manufactured by Dow Chemical Company having an average molecular weight of about 1200.
[3]Bis(2,2,6,6-tetramethylpiperidin-4-yl) sebacate available from Ciba-Geigy Corporation.

These materials were combined in a container and mixed on a shaker containing glass media for 30 minutes. After filtering the glass media, 78.63 parts of that mixture were combined with 21.37 parts aliphatic polyisocyanate (Desmodur® L-2291, biuret of hexamethylene diisocyanate marketed by Mobay Company) and immediately sprayed over primed aluminum panels and allowed to air dry.

The coating composition could be applied by conventional spray equipment at a volume solids of approximately 65 percent. (Weight solids were more than 75%.) The cured coatings showed a 60° gloss of 0.5% and an 85° gloss of about 1.5% and showed less than 10 percent reflectance of near infared radiation having wave lengths from about 0.7 to about 1.5 microns.

The coated panels passed 720 hours of exposure to humidity, passed 500 hours of Weather-O-Meter exposure without color change, passed a one inch Mandrel flexibility test at −65° F., and were resistant to lubricating oil, hydrocarbon fluid, Skydrol® and water.

EXAMPLE 7

A tan colored high solid coating composition was prepared in the following manner. The following materials:

| Raw Materials | Parts by Weight |
| --- | --- |
| Lampblack acidic | 2.59 |
| Ferrite yellow | 1.85 |
| Ferric oxide | 33.80 |
| Titan yellow | 193.27 |
| Basic copper phosphate (from Example 1) | 907.41 |
| Clear solid beads (from Example 2) | 512.51 |
| Polyester polyol[1] | 885.08 |
| Dibutyltin dilaurate (10% solution) | 68.96 |
| Cellulose acetate butyrate (10% solution) | 68.96 |
| 2-ethoxyethyl acetate | 623.91 |
| n-butyl acetate | 623.91 |
| Methyl Ethyl Ketone | 155.98 |
| Xylene | 155.98 |

[1]Desmophen ® 670-90 marketed by Mobay Chemical Corp., NVM 90%, hydroxy number 125.

These materials were combined in a container and mixed on a shaker containing glass media for 30 minutes. After filtering the glass media, 100 parts of that mixture were combined with 13.36 parts aliphatic polyisocyanate (Desmodur® L-2291 marketed by Mobay), and immediately spray applied, at approximately 63% solids by weight, over primed untreated aluminum panels. The panels were cured 60 minutes at 120° F. The matte coatings showed a 60° gloss of 0.2% and an 85° gloss of 1.6% and showed less than 10% reflectance of near infrared radiation having wavelengths from about 0.7 to 1.5 microns.

While this invention has been described by a number of specific embodiments, it is obvious that other variations and modifications may be made without departing from the spirit and scope of the invention as set forth in the appended claims.

The invention claimed is:

1. A high solid coating composition which comprises:
   (a) 5–50% by weight of a volatile portion which comprises at least one inert organic solvent; and
   (b) 50–95% by weight of a non-volatile portion which comprises:
      (i) at least one active hydrogen functional polymer having a number average molecular weight less than about 6,000;
      (ii) polymeric beads dispersed within the polymer;
      (iii) at least one infrared radiation absorbing pigment selected from the group consisting of copper phosphate, basic copper phosphate, copper pyrophosphate, tungsten trioxide and mixtures thereof; and
      (iv) a crosslinking agent reactive with the active hydrogen functional polymer under curing conditions
   wherein the coating composition, when applied to a substrate and allowed to cure or dry, is further characterized in that the cured or dried coating has a level of reflectance of near infrared radiation of less than 10% and has an 85° visible gloss of less than 10.

2. The coating composition of claim 1 further characterized n that at least part of the infrared absorbing pigment is incorporated within the polymeric beads.

3. The coating composition of claim 1 further characterized in that all of the infrared absorbing pigment is incorporated within the polymeric beads.

4. The composition of claim 1 further characterized in that the polymeric beads have an average particle size diameter from about 0.1 to about 100 microns.

5. The composition of claim 1, further characterized in that the polymeric beads are vesiculated beads.

6. The composition of claim 1 further characterized in that polymeric bead is substantially free of vesicles.

7. The coating composition of claim 1 further characterized in that the active hydrogen functional polymer has a number average molecular weight less than about 3,000.

8. The coating composition of claim 1 further characterized in that the active hydrogen functional polymer has a number average molecular weight less than about 1,500.

9. The coating composition of claim 1 further characterized in that the active hydrogen functional polymer has hydroxyl functionality.

10. The coating composition of claim 1 further characterized in that the active hydrogen functional polymer component includes a polycaprolactone polyol.

11. The coating composition of claim 1, further characterized in that the crosslinking agent is a polyisocyanate.

12. The coating composition of claim 1 further characterized in that the volatile portion is present at a level of 5-35% by weight, and the non-volatile portion is present at a level of 65%-95% by weight.

13. A process for increasing the absorption of infrared radiation at the surface of a substrate which process comprises applying a high solids coating to the surface of the substrate and allowing the coating to cure and/or dry; wherein the coating comprises:

(a) 5-50% by weight of a volatile portion which comprises at least one inert organic solvent; and (b) 50-95% by weight of a non-volatile portion which comprises:

(i) at least one active hydrogen functional polymer having a number average molecular weight less than about 6,000;

(ii) polymeric beads dispersed within the polymer;

(iii) at least one infrared radiation absorbing pigment selected from the group consisting of copper phosphate, basic copper phosphate, copper pyrophosphate, tungsten trioxide and mixtures thereof; and (iv) a crosslinking agent reactive with the active hydrogen functional polymer under curing conditions;

wherein the coating composition, when applied to a substrate and allowed to cure or dry, is further characterized in that the cured or dried coating has a level of reflectance of near infrared radiation of less than 10% and has an 85° visible gloss of less than 10.

14. A high solid coating composition which comprises:

(a) 5-50% by weight of a volatile portion which comprises at least one inert organic solvent; and (b) 50-95% by weight of a non-volatile film-forming portion which comprises:

(i) at least one hydroxyl functional polymer having a number average molecular weight less than about 6,000;

(ii) polymeric beads dispersed within the hydroxyl functional polymer wherein at least one radiation absorbing pigment selected from the group consisting of copper phosphate, basic copper phosphate, copper pyrophosphate, tungsten trioxide and mixtures thereof is incorporated within the polymeric beads; and (iii) a polyisocyanate.

15. The high solid coating composition of claim 14 further characterized in that the polymeric beads have an average particle size diameter from about 0.1 to about 100 microns.

16. The high solid coating composition of claim 14 further characterized in that the polymeric beads are vesiculated beads.

17. The high solid coating composition of claim 14 further characterized in that the polymeric bead is substantially free of vesicles.

18. The high solid coating composition of claim 14 further characterized in that the active hydrogen functional polymer has a number average molecular weight less than about 3,000.

19. The high solid coating composition of claim 14 further characterized in that the active hydrogen functional polymer has a number average molecular weight less than about 1,500.

20. The high solid coating composition of claim 14 further characterized in that the active hydrogen functional polymer component includes a polycaprolactone polyol.

21. The high solid coating composition of claim 14 further characterized in that the volatile portion is present at a level of 5-35% by weight, and the non-volatile portion is present at a level of 65%-95% by weight.

22. A process for increasing the absorption of infrared radiation at the surface of a substrate which process comprises applying a high solids coating to the substrate and allowing the coating to cure and/or dry; wherein the coating comprises:

(a) 5-50% by weight of a volatile portion which comprises at least one inert organic solvent; and (b) 50-95% by weight of a non-volatile film-forming portion which comprises:

(i) at least one hydroxyl functional polymer having a number average molecular weight less than about 6,000;

(ii) polymeric beads dispersed within the hydroxyl functional polymer wherein at least one radiation absorbing pigment selected from the group consisting of copper phosphate, basic copper phosphate, copper pyrophosphate tungsten trioxide and mixtures thereof is incorporated within the polymeric beads; and (iii) a polyisocyanate; wherein the coating composition, when applied to a substrate and allowed to cure or dry, is further characterized in that the cured or dried coating has a level of reflectance of near infrared radiation of less than 10% and has an 850 visible gloss of less than 10.

* * * * *